US011775629B2

(12) United States Patent
Khwaja et al.

(10) Patent No.: US 11,775,629 B2
(45) Date of Patent: *Oct. 3, 2023

(54) CLIENT DEVICE INFORMATION FOR CONTROLLING ACCESS TO WEB APPLICATIONS

(71) Applicant: Nasdaq, Inc., New York, NY (US)

(72) Inventors: Anis A. Khwaja, Huntington, NY (US);
Dimitry Fayerman, Acton, MA (US);
Vladimir Mitevski, New York, NY (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,746

(22) Filed: Dec. 23, 2021

(65) Prior Publication Data
US 2022/0114250 A1    Apr. 14, 2022

Related U.S. Application Data

(63) Continuation of application No. 15/708,257, filed on Sep. 19, 2017, now Pat. No. 11,216,551.

(Continued)

(51) Int. Cl.
*G06F 21/44*    (2013.01)
*G06F 16/951*    (2019.01)
(Continued)

(52) U.S. Cl.
CPC ............ *G06F 21/44* (2013.01); *G06F 16/951* (2019.01); *H04L 63/0428* (2013.01);
(Continued)

(58) Field of Classification Search
CPC ... G06F 21/44; G06F 16/951; H04L 63/0428; H04L 63/105; H04L 67/02; H04L 67/141; H04L 67/148
(Continued)

(56) References Cited

U.S. PATENT DOCUMENTS

2007/0180503 A1\* 8/2007 Li .......................... H04L 67/02
726/5
2012/0210413 A1\* 8/2012 Akula ................. H04L 63/0815
726/8

(Continued)

OTHER PUBLICATIONS

PCT Notice International Preliminary Report on Patentability International Application No. PCT/US17/52172 dated Oct. 22, 2018.
(Continued)

*Primary Examiner* — Jeffrey C Pwu
*Assistant Examiner* — Nega Woldemariam
(74) *Attorney, Agent, or Firm* — Nixon & Vanderhye, PC

(57) ABSTRACT

The described technology provides for plural application processes including at least one application in a browser to reliably acquire device information that can be used by other processes to accurately determine whether the plural applications are running on the same client device and/or are associated with aspects of the same client device. The more reliable determination of the devices associated with respective application processes can be used for various purposes such as, for example, user access management capabilities such as improved single sign-on (SSO) capability and/or improved multiple login prevention (MLP) capability.

18 Claims, 8 Drawing Sheets

Related U.S. Application Data

(60) Provisional application No. 62/396,612, filed on Sep. 19, 2016.

(51) Int. Cl.
  *H04L 67/148* (2022.01)
  *H04L 67/02* (2022.01)
  *H04L 67/141* (2022.01)
  *H04L 9/40* (2022.01)

(52) U.S. Cl.
  CPC ............ *H04L 63/105* (2013.01); *H04L 67/02* (2013.01); *H04L 67/141* (2013.01); *H04L 67/148* (2013.01)

(58) Field of Classification Search
  USPC ............................................................ 726/4
  See application file for complete search history.

(56) References Cited

U.S. PATENT DOCUMENTS

| | | |
|---|---|---|
| 2013/0227635 A1 | 8/2013 | Walsh |
| 2014/0244488 A1 | 8/2014 | Kim et al. |
| 2015/0326562 A1 | 11/2015 | Okta |
| 2016/0219039 A1 | 7/2016 | Houthooft |

OTHER PUBLICATIONS

International Search Report and Written Opinion corresponding PCT Appln. No. PCT/US17/52172 dated Dec. 1, 2017.

\* cited by examiner

CLIENT DEVICE INFORMATION FOR CONTROLLING ACCESS TO WEB APPLICATIONS

CROSS-REFERENCE TO RELATED APPLICATIONS

This application is a continuation of U.S. application Ser. No. 15/708,257, filed on Sep. 19, 2017, now allowed, which claims the benefit of, and claims priority to, U.S. Provisional Application No. 62/396,612 filed on Sep. 19, 2016, the content of which is incorporated herein in its entirety.

TECHNICAL OVERVIEW

The technology described herein relates to controlling access to computer server resources. More particularly, the technology described herein relates to reliably identifying the source computer of each request for service at a computer server.

INTRODUCTION

Web application deployments enable a large number of users to access one or more web applications and/or resources controlled by web applications. For example, a large corporation may deploy an enterprise software application ("web application") on one or more servers in its corporate network or other Internet-accessible computer, and enable all its employees and/or clients to access that application via the web. Web-accessibility of such applications provide employees and/or clients with the ability to access the application at any time and from anyplace where a client device has network connectivity.

Also, web applications are accessible using information processing devices of different types. The same user may sometimes access a web application using different information processing devices. For example, a user may attempt to access the web application using his smartphone while also simultaneously accessing it via a desktop computer. Sometimes the web application may be accessed by the same user using two different browsers (e.g., Chrome™ by Google and Internet Explorer™ by Microsoft).

Thus, web application deployments provide numerous benefits related to accessibility and availability. The capability for the same user to simultaneously access the web application using more than one device or one browser, and/or other client application, may improve aspects of a user's interaction with a web application, such as efficiency and convenience.

However, the increased convenience of web applications offered by advances in software technology and network technology, unless properly controlled, can also result in misuse of access privileges. For example, in the case of a web application for which a license or access fee is charged by the provider on a per user basis, some users may attempt to avoid paying the full fee by using another user's privileges to access the web application, thus potentially depriving the provider some amount of revenue. Such misuse of access privileges can also negatively affect the system capacity available for fee-paying users and/or negatively affect the system performance experienced by users.

Therefore, technology is needed for improving protection of application providers' resources and/or for improving the enforcing of application usage restrictions.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

SUMMARY

The described technology relates to controlling access to web applications and resources controlled by such applications. The described technology provides for plural application processes, including at least one application running in a browser, to reliably acquire device information that can be used by another process to accurately determine whether the plural applications are running on the same client device and/or are associated with aspects of the same client device. The more reliable determination of the devices associated with respective application processes can be used for various purposes such as, for example, user access management capabilities such as a single sign-on (SSO) capability and a multiple login prevention (MLP) capability. The SSO capability provides for a user who is already signed on to a web application from a client application to not be required to sign-on again when he/she later attempts to access the web application from the same or another client device. The SSO capability can improve a user's experience associated with the web application by reducing the number of times the user has to go through the sign-on process. The MLP capability can be used to detect potentially suspicious sign-on scenarios and disable one or more active sessions when a suspicious sign-on is detected. MLP can also be used to restrict a particular user to access the application only from one client device.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other subjects, providing client device information to plural applications running on the same client device so that the plural applications can transmit the provided client device information to an external application, such that controlling of user access to one or more web applications from respective application processes is enabled. Some example embodiments can be used in an SSO capability that provides users with the convenience of performing the login process once, and having subsequent access to other aspects of the same application or related applications be performed with reduced authentication or without requiring further sign-on actions. Some example embodiments may be used in a MLP capability that may help enforce usage restrictions specified for web applications, and also help protect the processing capacity of the servers that run web applications. The MLP capability may be used, for example, to detect when the same identifier/credential (e.g., a user ID or credential of a particular user) is used to access a web application from multiple endpoints at the same time, and may act to cancel one or more sessions in order to reduce misuse of access capabilities to the web application.

Figure 1:
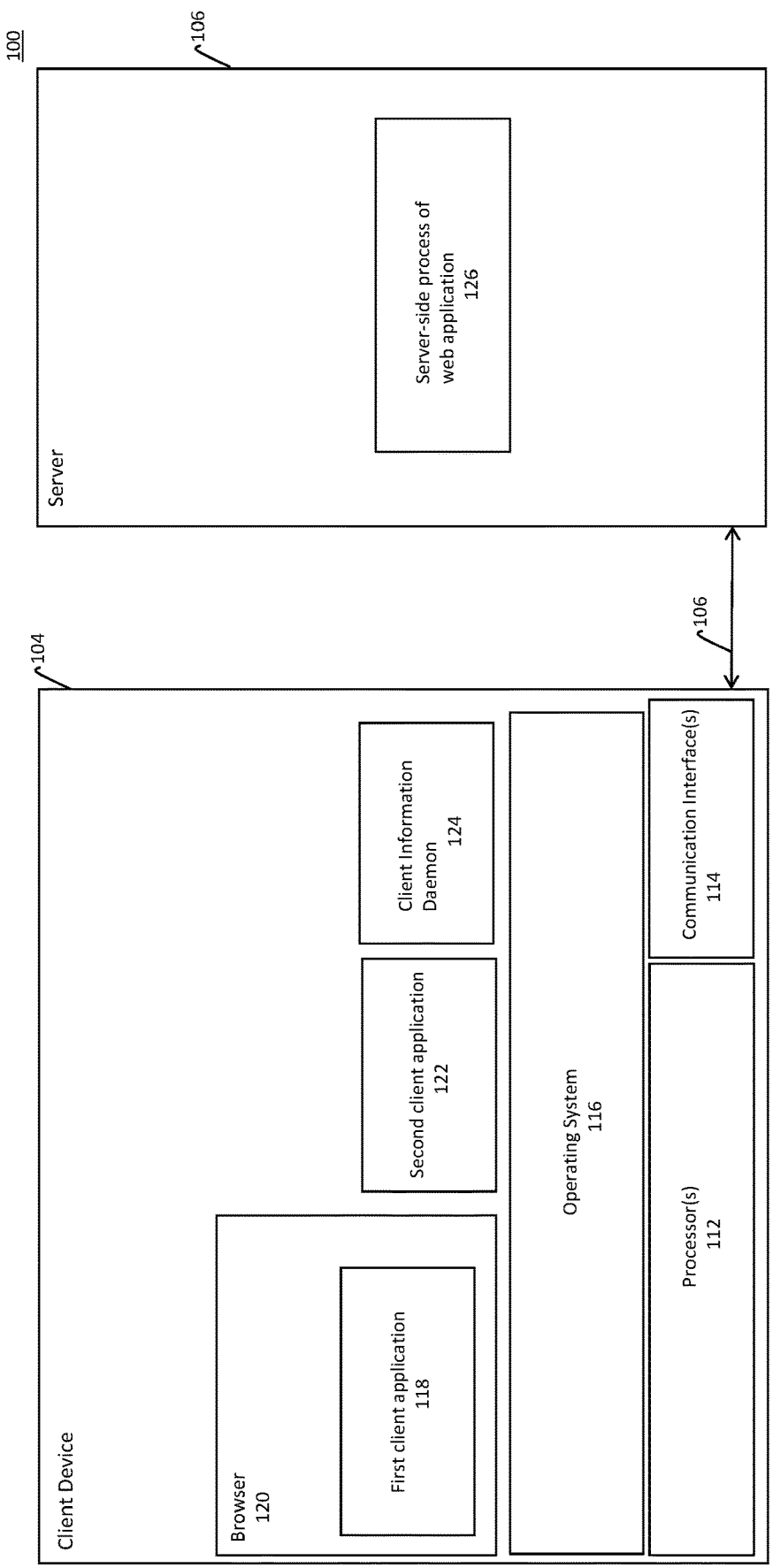
FIG. 1 illustrates a client device and a server device, with the client device having running on it a client information process which provides client device information to plural applications running in the same client device, including at least one browser-based application, for communication by the plural applications to a server, according to some embodiments.

Description of FIG. 1

FIG. 1 illustrates a non-limiting example computing system 100 in which a server device 102 and a client device 104 are connected via a network 106. The client device 104 has running (i.e., currently executing) on it a first client application 118 in a web browser 120, a second client application 122 and a third process 124. The third process 124 may be a server process/application, such as, for example, an HTTP server. The third process 124 is configured to, at least in part, provide client device information to application processes running on the client device. For example, the third process 124 may listen for requests, from the application processes, for client device information on a communication port that is known to, or is discoverable by, the application processes on the same client device. When a request for client device information is received, the third process 124 returns either predetermined, or generated in real-time, client device information to the requesting application process. The client device information may be information that uniquely, or at least distinguishably, identifies the client device, a hardware element of the client device, and/or a software element of the client device. According to some embodiments, the client device information (also referred to as "client device specific information") is selected so that each different client device information value uniquely identifies a client device that communicates with the server-side process. Client device information that distinguishably identify a client device may include unique serial numbers that are defined at the time of, or after, manufacture of the client device. Alternatively, the client device information may be, or may include, a hardware address or serial number that is assigned to, or encoded into, a hardware element (e.g., processor(s) 112, a network/communication interface card(s) 114) of the client device, or a license and/or activation key of a software application installed on the client device. The hardware addresses and/or serial numbers may be either assigned at the time of manufacture or subsequently configured.

The third process 124 (also referred to as "client information daemon") may obtain the client device information from the operating system 116. For example, the third process 124 may call an operating system function or application program interface (API). For example, the third process 124 may directly call an operating system function by including a call to that function in the code of the third process. In another example, the third process 124 may call an operating system function by exchanging messages with a privileged process (e.g., a process having enhanced or super user privileges) that responds only to other processes having adequate access privileges. The third process 124 may be configured to run with access privileges different from access privileges of one or more of the other processes, and sufficient for accessing the operating system or other function to acquire the desired client device information. For example, while the one or both of the first and second applications are run with user level privileges that are insufficient to access client device operating system and hardware information, the third process 124 may be run with super user privileges, or with user level privileges that are sufficient to access particular operating system information and/or hardware information that are used in the usage scenarios described below as client device information. Thus, in the example, the operating system will process a function call made by the third process to access the client device information, while it would disallow access to that information to the first or second application processes if the same function call were to be made by the first or second applications with insufficient access privileges.

In some embodiments, the third process 124 may, directly or indirectly, be automatically configured by the server-side web application 126. For example, at regular or configured intervals, server-side web application 126 might provide the third process 124 with a character string that the third process may attach to (e.g., concatenate with) the client device's hardware or software identifiers in order to generate the client device information subsequently provided to the first and second client applications. The makeup of such a character string can be controlled (e.g., in a time-varying manner) by the server-side and can provide for additional reliability and/or control of the SSO and MLP features. For example, the server can change the character string at regular time intervals, and by checking, in addition to whether the hardware/software identifiers provided by the first and second client applications match, that the same character string as configured by the server is returned by both the first and second client applications, the server has an additional level of assurance that the first and second client applications both get the client device information from the client information process 124. The communication between the third process 124 and server-side web application 126 may be independent of the first and second client applications. In some example embodiments, the third process 124 may receive configuration information such as that described above from a server-side process other that the web application.

The first client application 118 executes within a browser 120. The first client application 118 therefore executes within a sandbox (or other form of a restricted memory area), or a portion of memory area defined within the memory of the client device 102, and may not have sufficient access privileges for obtaining the operating system, hardware or other information of the underlying hardware and/or associated software, for inclusion in the client device information.

The second client application 122 may or may not have direct access to functions for obtaining the operating system, hardware or other information for inclusion in the client device information.

The first client application 118 and the second client application 122 are both client side portions of a web application for which the server-side portion runs on server 102. They are each configured to obtain client device information from the third process 124, and to transmit the obtained client device information, or one or more values derived therefrom, to the server-side process 126 on server device 102. The purpose of including distinctive client device information, or information derived therefrom, in the request to the server-side process, is to enable the server to determine with improved reliability whether or not the first client application and the second client application reside on the same client device.

The server-side process 126 of the web application may be configured to compare the client device information (or information derived therefrom) received from the first client application 118 with the client device information (or information derived therefrom) received from the second client application 122. The comparing may be performed in response to receipt of the second request from the second client application (or, in response to the first request from the first client application if that is received before the second request). Comparing of the client device information included in a first query from the first client application and a second query from the second client application results in a determination being made by the server-side process 126 as to whether the first client application and the second client application have provided the same client device information.

A determination that the first client application and the second client application have provided the same client device information may result in a first type of processing on the server-side and/or a first type of message being returned to the first and/or second client applications on the client device 104. For example, a determination that the second client application 122 provided the same user credentials and the same client device information as provided by the first client application 118, may lead to the server 102 facilitating SSO.

A determination that the first client application 118 and the second client application 122 have not provided the same client device information may result in a second type of processing on the server-side and/or a second type of message being returned to the first and second client applications. For example, a determination that the second client application 122 provided the same user credentials but different client device information than provided by the first client application 118, may lead to the server 102 enforcing MLP.

Example implementations of SSO and MLP are described below in relation to FIGS. 4-6.

Figure 2:
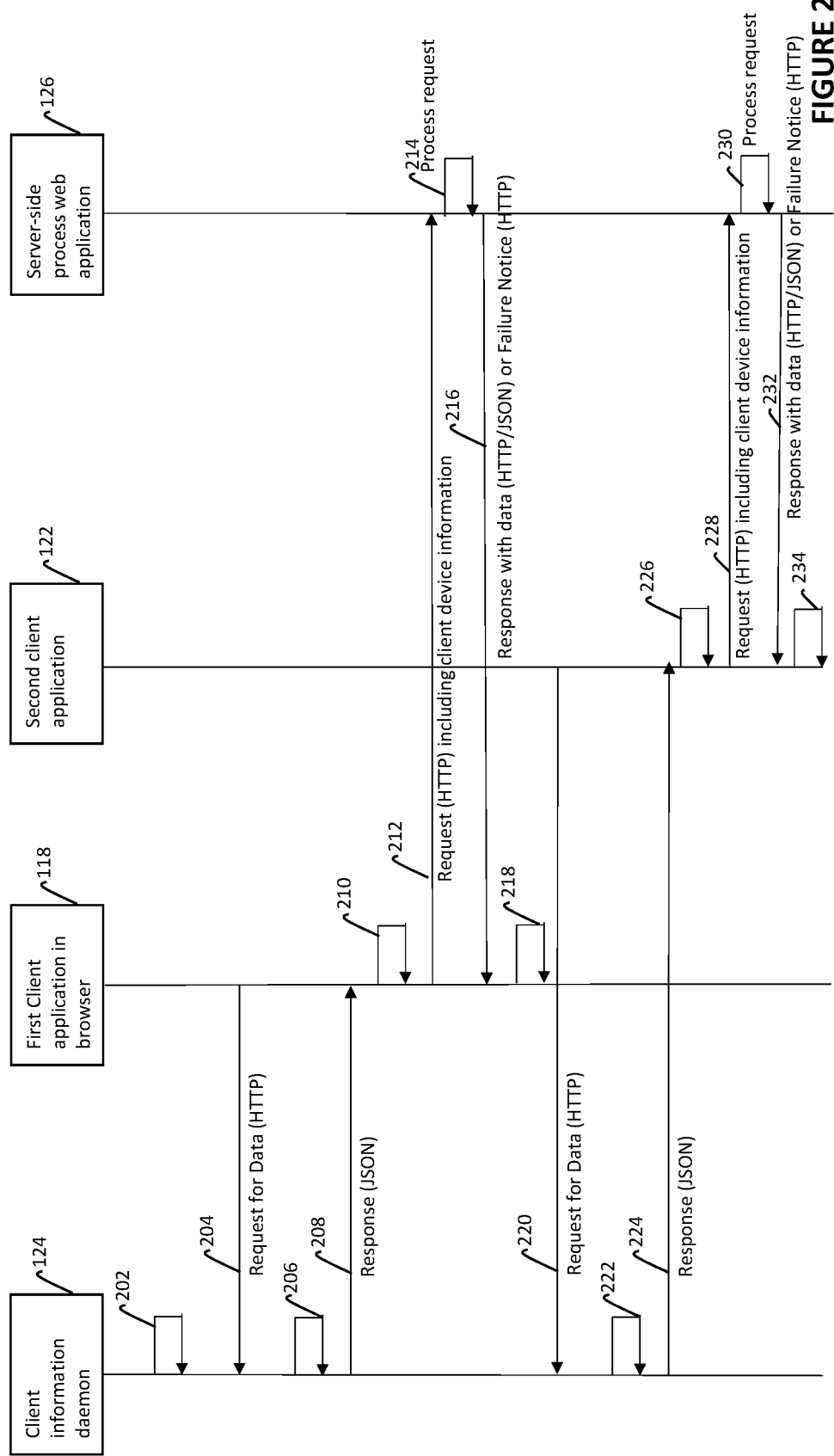
FIG. 2 illustrates a flow diagram illustrating interactions between the client information process and the plural applications on the client device of FIG. 1, and interactions between the other applications and a server-side process on the server device of FIG. 1, according to some embodiments.

Description of FIG. 2

FIG. 2 illustrates a flow diagram showing interactions between the client information process 124 and the application processes (i.e., first client application 118 and second client application 122) on the client device 104 of FIG. 1, and interactions between the other processes and the server-side process 126 on the server device 102 of FIG. 1, according to some embodiments;

At operation 202, the client device information process 124 is started and initialized. The process 124 can be started upon client device startup, or by another process. In certain example embodiments, the process 124 may be started at anytime before client applications of the web application to be accessed are started on the client device. The process 124 is a daemon process configured to run as a background process listening to incoming messages and responding to the received messages in the background. Upon starting up, process 124 identifies a port at which to listen for messages. In some embodiments, the process 124 sequentially checks ports beginning at a predetermined port number. The predetermined starting port number (e.g., port 51172) may be specified as a configuration parameter. When it identifies an available port, process 124 binds to that identified port and begins waiting for messages to be detected at that port. In some embodiments, the process 124 binds as an HTTP server to the first available port identified.

Process 124 includes capabilities to receive HTTP queries at the identified (and bound to) port, and to respond to the received queries. The HTTP queries that can be handled by the process 124 may be limited. For example, in some embodiments, process 124 may be capable of only handling (e.g., servicing/responding to) HTTP queries of a particular format defined for client applications to request client device information. In some embodiments, in addition to the HTTP queries in the particular format, process 124 may also communicate with the server as described above to receive configuration strings etc. that can be attached to the client device information subsequently provided in response to HTTP queries.

At operation 204, process 124 receives a HTTP request for client device information from the first client application 118. The first client application 118 executes within a browser 120 on the same client device 104 as the process 124. The first client application 118 may be the only application executing in the browser 120, or it may be one of several applications executing within the same browser 120.

The first client application 118 is configured to, before sending an HTTP query to process 124, automatically determine the port at which process 124 is listening for HTTP queries. According to some embodiments, the first client application 118 starts at a predetermined port and incrementally tests ports until it identifies the port at which process 124 is listening. For example, it may send a HTTP GET request to http://localhost:<port>/ping URL, starting at a predetermined port (e.g., <port>=51172) and incrementally upwards until it receives a response with HTTP status code 200 indicating success and with a predetermined hardcoded daemon-identifying string. The predetermined hardcoded daemon-identifying string may be any string that will enable client applications, such as the first client application 118, to determine that the message is from the process 124. An example non-limiting predetermined hardcoded string to be returned may be "ClientInformationDaemon".

First client application 118 may be configured to ping every port, beginning at the predetermined port, up to a predetermined maximum number of ports (e.g., 500). If first client application 118 does not receive a HTTP message 200 (i.e., HTTP message with a status of success) with the predetermined string, the first client application may decide that the process 124 does not exist and may terminate itself. If first client application 118 does identify the port at which process 124 is listening, it generates the HTTP query for client information and transmits to process 124 at the identified port.

The HTTP query for client information may, at least in some embodiments, include the following information: a command identifier, a timestamp and a serial number. The command identifier may be a hardcoded command identifier such as "deviceInfoRequest" or "deviceIdRequest". The command identifier may be used to validate encryption. The timestamp may be the current time of the client device 102 represented in UTC format (e.g., YYYYMMDDhhmmss format-YYYY representing the year in four digits, MM representing the month in two digits, DD representing the date in two digits, hh representing the hour according to a 24 hour clock in two digits, mm representing minutes in two digits, and ss representing seconds in two digits). The serial number may be any globally unique serial number (GUID). In some embodiments, the HTTP query may not include the serial number.

An example HTTP query may be of the form: http://localhost:51172?cmd=deviceIdRequest&ts=20160824142603&serial=413 DD6B5-2EF7-4A74-B046-D841DFC6C3F7.

The HTTP request is encrypted. The encrypted request may then be subjected to base 64 encoding and to URL encoding. Base 64 encoding and URL encoding is performed to improve reliable communication of the request. The encrypted and encoded request is included as the "request" URL parameter in the query.

The encrypted and encoded message may have the command identifier (e.g., "deviceIdRequest") in unencrypted form while the request parameter is encrypted, and may be of the form: http://localhost:51172?deviceIdRequest=aasdlkajsdfnaslfkajsdfivasdlfknmasdfpaoisjufelknmlks.

The applied encryption may be based upon any technique which provides for secure communication between the first client application 118 and client information process 124. In some embodiments, a pre-shared key scheme is used. A symmetric private key may be used for encrypting and decrypting requests. For example, and without limitation, the Rijndael algorithm with CBC cipher mode, 128 block size and PKCS7 padding mode may be used. A random 16 byte initialization vector (IV) can be used for each encryption, and the IV value can be prepended to the encrypted string.

At operation 206 the client information process 124 receives the HTTP request. The HTTP request is decrypted and validated to ensure that the request has been correctly received (e.g., correctly received and decrypted). After decryption, the validation may be performed by determining whether the command identifier included in the request matches the expected value. For example, in some embodiments, it is adequate only to confirm that the expected value of "deviceIdRequest" is present in the decrypted portion of the HTTP request. Process 124 may or may not validate other values such as the timestamp. However, because the communication between the first client application 118 and process 124 takes place within the same client device, a minimal level of validation can provide a satisfactory balance between processing costs for validation (e.g., for reliability) and the speed of processing.

In response to the received HTTP request, process 124 constructs an appropriate response. The response may include one or more pieces of client device information, a timestamp, and a serial number. The client device information may be, as described above, a device identifier and/or a software identifier assigned to the client device. In some embodiments, the client device information returned by process 124 may include a hardware/software identifier (e.g., an identifier obtained by process 124 by calling an operating system provided function that is accessible only with certain high level access privileges) as only a part, and may also include a static or dynamically generated character string or the like that is generated or determined without requiring any particular access privilege level. In some embodiments, such a character string may be provided to the process 124 by a server-side process. The timestamp may be the same timestamp value which was in the HTTP request being responded to. The serial number may be, or may be based upon, the serial number which was received in the HTTP request.

At operation 208, the constructed response is transmitted by process 124 to first client application 118. The response may be in JSON format. In a manner similar to the HTTP request described above, the response may be encrypted and encoded.

At operation 210, the first client application 118 receives the response. The received response is decrypted and validated. The validation may include ensuring that the received serial number matches the serial number included in the corresponding HTTP request.

At least in some embodiments, the validation may also include a time-based validation. For example, the timestamp included in the response may be compared to the current time of the client device to determine whether the response has been received within a predetermined time interval. The predetermined time interval may be configurable and may be set in accordance with typical processing times observed on the client machine. An example non-limiting predetermined time interval for validation may be 1 minute. If the current time at the client device is more than the predetermined time interval from the timestamp value in the response, then it may be determined that the response is invalid. This type of validation may prevent, or reduce the possibility of, reuse of valid responses by malicious third parties.

At operation 212, the first client application 118 transmits a request (e.g., an HTTP request) to the server-side process 126 of the web application on server 102. The request may include a cookie which includes the client device information obtained from the client information process 124. In some embodiments, the cookie may include information that is based on the obtained client device information which was previously obtained for the session and stored in the client. The request would indicate what is being requested, such as, for example, sign-on for the user or data for use during application processing.

At operation 214, the server-side process 126 receives the request from the first client application 118. The processing at operation 214 may take into consideration the client device information that was included in the received request. The processing may include determining whether to allow the first client application to perform sign-on and/or join a currently active session, or whether the request is to be denied.

At operation 216, a response in HTTP/JSON format is returned to the first client application. The response may, based upon the processing at operation 214, include session information providing sign-on, requested data for a session, or a failure notice.

At operation 218, the first client application 118 receives the response from the server-side process 126 and accordingly performs processing.

The second client application 122, which is also running on the same client device 104 as the client information process 124 and the first client application 118, automatically determines the port at which the client information process 124 is listening for HTTP requests. The second client application 122 too may detect the port for client information process 124 in a manner similar to that described in relation to operation 204 above. At operation 220, the second client application 122 constructs a HTTP request for client device information and transmits to the client information process 124. The format of the HTTP request is of the same or similar format as that described in relation to operation 204 above.

At operation 222 the client information process 124 decrypts the request from the second client application 122 and performs processing similar to that described in relation to operation 206.

At operation 224, the client information process 124 transmits the request client device information to the second client application in a JSON message, in a manner similar to that described in relation to operation 208.

At operation 226 the second client application 122 receives the response from the client information process 124 and performs processing in a manner similar to that described in relation to operation 210 to decrypt and validate the response.

At operation 228 the second client application 122 transmits a request to the server-side process 126 of the web application on server 102. In a manner similar to that described in relation to operation 212 above, the request may include a cookie which includes the client device information obtained from the client information process 124. In some embodiments, the cookie may include information that is based on the obtained client device information which was previously obtained for the session and stored in the client. The request would indicate what is being requested, such as, for example, sign-on or data.

At operation 230, the server-side process 126 receives the request from the second client application 122. In a manner similar to that described in relation to operation 214 above, the processing at operation 230 may take into consideration the client device information that was included in the received request. The processing may include determining whether to allow the second client application to perform sign-on and/or join a currently active session, or whether the request is to be denied. According to example embodiments, the determining of whether or not to allow SSO may be based upon whether the client device information provided by the second client application corresponds to the client device information provided by the first client application which already has an active session. In some embodiments, the server may require the client device information provided by the first and second client applications to be identical in order to correspond to each other. In some other embodiments, a partial match between the two client device information strings may provide sufficient correspondence for the server to determine that the first and second requests are from the same client device.

At operation 232, a response in HTTP/JSON format is returned to the second client application. In a manner similar to that described in relation to operation 216 above, the response may, based upon the processing at operation 230, include the requested data or a failure notice.

At operation 234, the second client application 122 receives the response from the server-side process 126 and accordingly performs processing.

Figure 3:
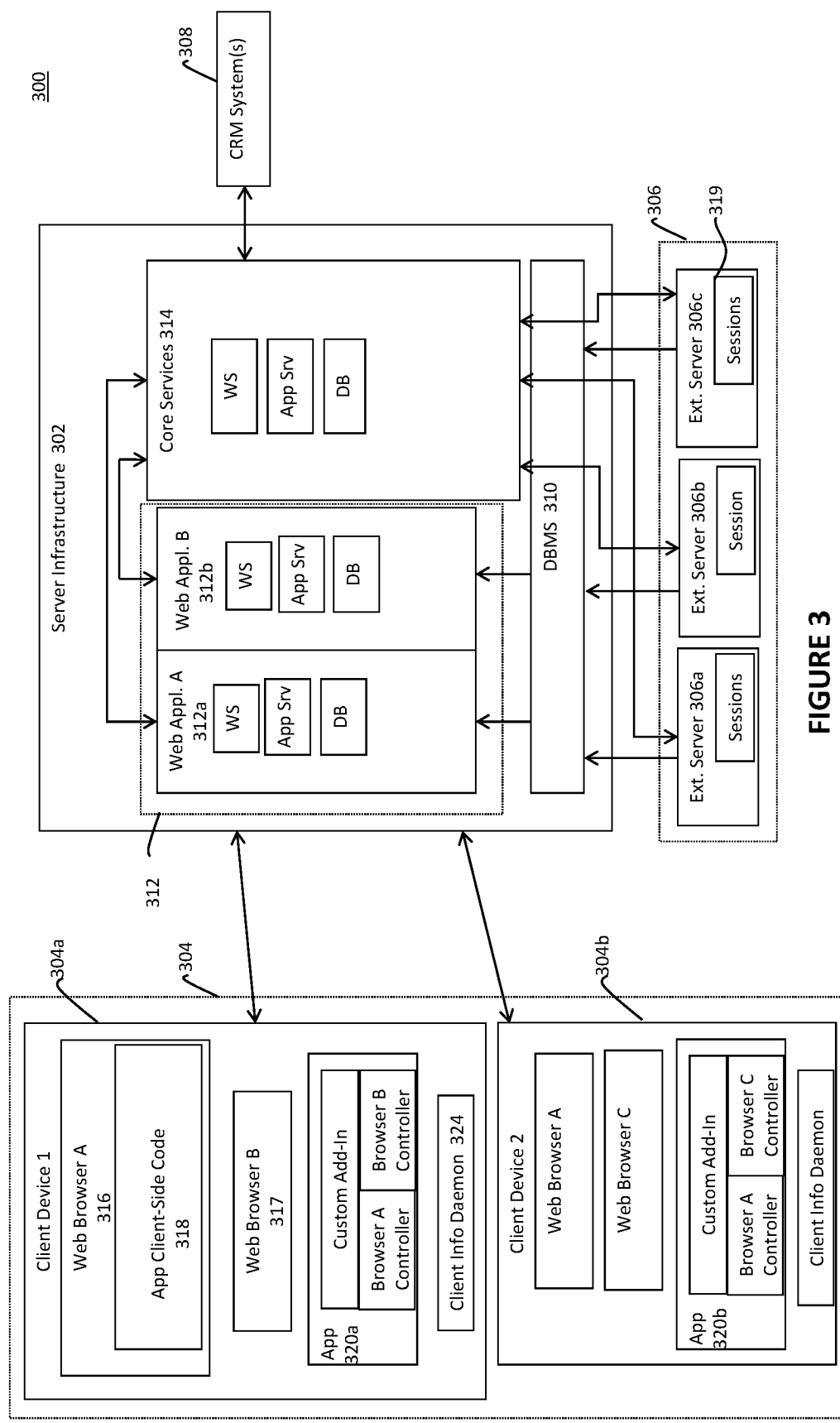
FIG. 3 illustrates a computing environment having one or more client devices, and one or more server devices executing web applications, according to some example embodiments.

Description of FIG. 3

FIG. 3 illustrates a non-limiting computing environment 300 including one or more servers 302 (also referred to herein as "server infrastructure") and one or more clients 304, according to some embodiments. The one or more servers 302 communicate with clients 304 and one or more external servers, so that users on clients 304 can access web applications 312 executed on the one or more servers 302. Servers 302 may also communicate with a document management system 308. Servers 302 may include a server such as server device 102 described above, and clients 304 may include a client such as client device 104. The communication between the servers 302, clients 304, external servers 306, and document management system 308 may be over the internet or any other communication network.

Servers 302 may be implemented on one or more physical server computers that are communicatively connected to each other over a network. The one or more physical server computers may be geographically co-located or distributed. Servers 302 may include a database management system 310 and one or more server-side web applications 312 (e.g., 312a and 312b) and a core services application 314. The server-side process 126 described above may correspond to one or more server-side web applications 312.

Each web application 312 may be designed and operated according to a three-tier model of a web server, application server and database. As in conventional systems, the web server of each web application 312 includes the capability to communicate with external entities via HTTP and other protocols such as JSON, HTML, XML, JavaScript, Cascading Style Sheets (CSS), etc. The application server of each web application 312 provides the processing logic for the application, and the database of each web application 312 provides for storing and reading data.

Web applications 312 may interact with the core services application 314 for managing user authentication, with clients 304 (e.g., 304a and 304b) for receiving input from and for transmitting out to, and the database management system 310 and/or external servers 306 for obtaining information to be provided to the requesting client applications running on clients 304. In some embodiments, some or all of the information provided to requesting clients may be generated by the web application itself and/or other web application executing locally on the same one or more servers 302.

Core services application 314, which may also be designed and operated according to the three-tier model described above, may provide one or more services that are commonly used by the web applications 312. Example services that may be provided by core services application 314 include authentication of users, management of sessions, etc.

In some embodiments, core services application 314 can also provide session management to the external servers 306. For example, in a use case where two or more web applications 312 obtain data from a particular external server 306, core services application 314 may provide the capability to manage sessions between servers 302 and the external servers 306 in accordance with corresponding other sessions between clients 304 and servers 302. Each external server may store a copy 319 of a part of a session table maintained at the server 302.

Web applications 312 operate to receive requests from clients 304, perform processing and/or obtain information from the database 310 and/or external servers 306, and respond to clients 304 with a result from the processing and/or obtained data. Web applications 312 may utilize core services 314 for administering users and user sessions.

A web application may comprise one or more client-side components and one or more server-side components. Client-side components of a web application may operate to provide for handling the user interface by performing presenting (e.g., displaying) of information on a user interface device; receiving user input, etc. Server-side components may provide for authentication, service metering, generating or obtaining information to be presented to the user in accordance with received user inputs.

Embodiments are not limited to particular types of web applications. Web applications that may be used in embodiments include those designed according to the single page application (SPA) model, any non-SPA model, or a combination of both.

SPAs are web applications that operate within a single web page. In an SPA, the content for a single web page is sent by the web server to the web browser, and that page is loaded/rendered, as described above with the traditional web application. Subsequently, when the user wants to view different content within the application, the user will click a hyperlink or input on the page. But instead of navigating to a different page as in non-SPA web applications, the same page will remain loaded, and its content will be dynamically updated. This dynamic updating may be accomplished in a number of different ways; it may involve, for example, the web browser performing background HTTP fetches for new content, updating the Document Object Model (DOM) of the page (via JavaScript code), and/or other techniques.

AngularJS® is a web application framework that is used to create SPAs. At the web browser, AngularJS JavaScript libraries are loaded and interpret HTML templates which are embedded with AngularJS scripts and other AngularJS coding constructs, such that the resulting pages behave as defined in the templates. Other frameworks (e.g., Backbone.js, Ember.js, and React) may also be used for SPA applications.

In some non-SPA web application models, a web application includes a number of different web pages. To render a particular web page within the application, the following set of interactions is performed: a web browser at a client device requests (using an Hypertext Transfer Protocol (HTTP) message) a particular web page from a web server; in response, the web server transmits (using HTTP) the code for the page back to the web browser, the code including, e.g., HTML, JavaScript®, and Cascading Style Sheets (CSS) code; the web browser then loads the code and renders the page, thereby enabling a user to view and interact with the page. When the user subsequently wants to view different content within the application, the user will click a hyperlink or input on the page that points to a different page within the application, and then the above-mentioned request/response/load/render procedure is performed for the different page.

The database management system 310 (sometimes also referred to herein simply as the database), may be a commercially available DBMS, or other data record management system. Although shown as a single DBMS, DBMS 310 may include one or more separate databases. Embodiments are not limited to any particular type of database management system.

Clients 304a and 304b can be configured to execute the same or different client applications. In the illustrated example embodiment in FIG. 3, first clients 304a includes a web browser A 316 and a web browser B 317. Client 304a may also have stored on it a client-side app 320a which is a native app. When browser A 316 is used to access a web application 312, client-side code 318 for a web application 312 executed within browser A 316. In the same example embodiment, the second client 304b is configured to execute an app 320b which may be a native app. Client 304b may have browsers (e.g., as shown browser A and browser C) in addition to the native app 320b. The client-side code 318 and app 320 may perform client-side processing for a corresponding web application on server 302. For example, first client application 118 described above may correspond to client side code 318 shown in FIG. 3, and the second client application 122 described above may correspond to app 320 (320a or 320b).

Client information process 324, also referred to as a daemon process, may correspond to the client information process 124 described above in relation to FIGS. 1-2. Accordingly, client information process 324 operates to listen at a port for requests from web browsers 316, 317 and client-side code 318, or app 320a, and in response provide information specific to client device 304a that the applications subsequently use for communicating with server 302.

As illustrated in FIG. 3, when a client application (e.g., 316/318 or 320a/320b) communicates with a web application 312, the web application 312 may obtain any information requested by the client from one or more external servers 306 and provide to the client application. In some embodiments, some or all of the information provided to the requesting clients 304 may be generated locally by servers 302.

Clients 304 may include personal computers, mobile computers, tablets, smartphones, and other electronic devices. In some example embodiments, any electronic computing device including at least a display, an input device for user input, and a communication interface for communicating with the server device may operate as a client device.

The external servers 306 (e.g., 306a, 306b, 306c) may include one or more servers controlled by an entity (e.g., administrative entity) different from the entity controlling the one or more servers 302. For example, one or more of the external servers 306 may be managed by a service provider or vendor that, under a predetermined (e.g., previously agreed upon by an enterprise and a vendor) service specification, provides users on client devices 304 access to various application data and/or analysis. The service specification may be based upon one or more of a number of users, type and amount of information, duration of use, frequency of use etc., of the access to the external servers.

It should be understood that the software modules shown in FIG. 3 are stored in and executed by hardware components (such as processors and memories); and it should be further understood that, whenever it is described in this document that a software module performs any action, that is done solely for ease of description, and the action is in actuality performed by the underlying hardware according to the instructions and data that comprise the software module. Further details regarding example hardware components that may be used to implement the features described herein are provided below with reference to FIG. 7, as well as in other places in this document.

In an example implementation, the computing environment 300 may be associated with an enterprise, such as, for example, Nasdaq Corporation. Example web applications 312 may include real-time market analysis application and a client account status application. Users of the web applications 312 may include financial analysts or other employees of the enterprise. The core services application 314 may provide common services such as administration (e.g., creating user accounts, administering entitlements, etc.), authentication (e.g., create/manage sessions for users to access certain services, etc.) and authorization (e.g., check whether user is entitled to access certain services or features, etc.) for users. The servers 302 may represent one or more servers and the associated infrastructure used by the enterprise for running the web applications 312, core services application 314 and associated software. The document management system 108 may include a customer relationship management application that communicates with the web applications and/or core services application for delivering services to the corporation's users.

In this example implementation, the external servers 306 each may be operated by a respective vendor of application data. Each vendor may provide application data such as real-time financial market related information to entities such as Nasdaq Corporation under some sort of service specification (e.g., an agreed price based upon type of data, amount of use, number of users, etc.).

When an analyst using client 304a accesses the real-time market analysis application on servers 302, an SPA may be displayed on the client device, and various real-time or value-added information from the vendors (e.g., such as those operating external servers 306) and/or the corporation's internal analysts etc., can be displayed in the one or more portions of the displayed SPA.

The external servers 306 (e.g., vendors), although providing the information requested and capable of identifying the users accessing its services, may rely upon the enterprise (as the "vendor of record") to ensure its user's compliance with the terms of use specified, for example, in a service specification agreed between the enterprise and the vendor. For example, based upon the agreement with a particular vendor, the core services application may be used to assign entitlements (a specification of type/amount of data accessible and other restrictions, if any) to the users and/or web applications to access/obtain data from that particular vendor.

Figure 4:
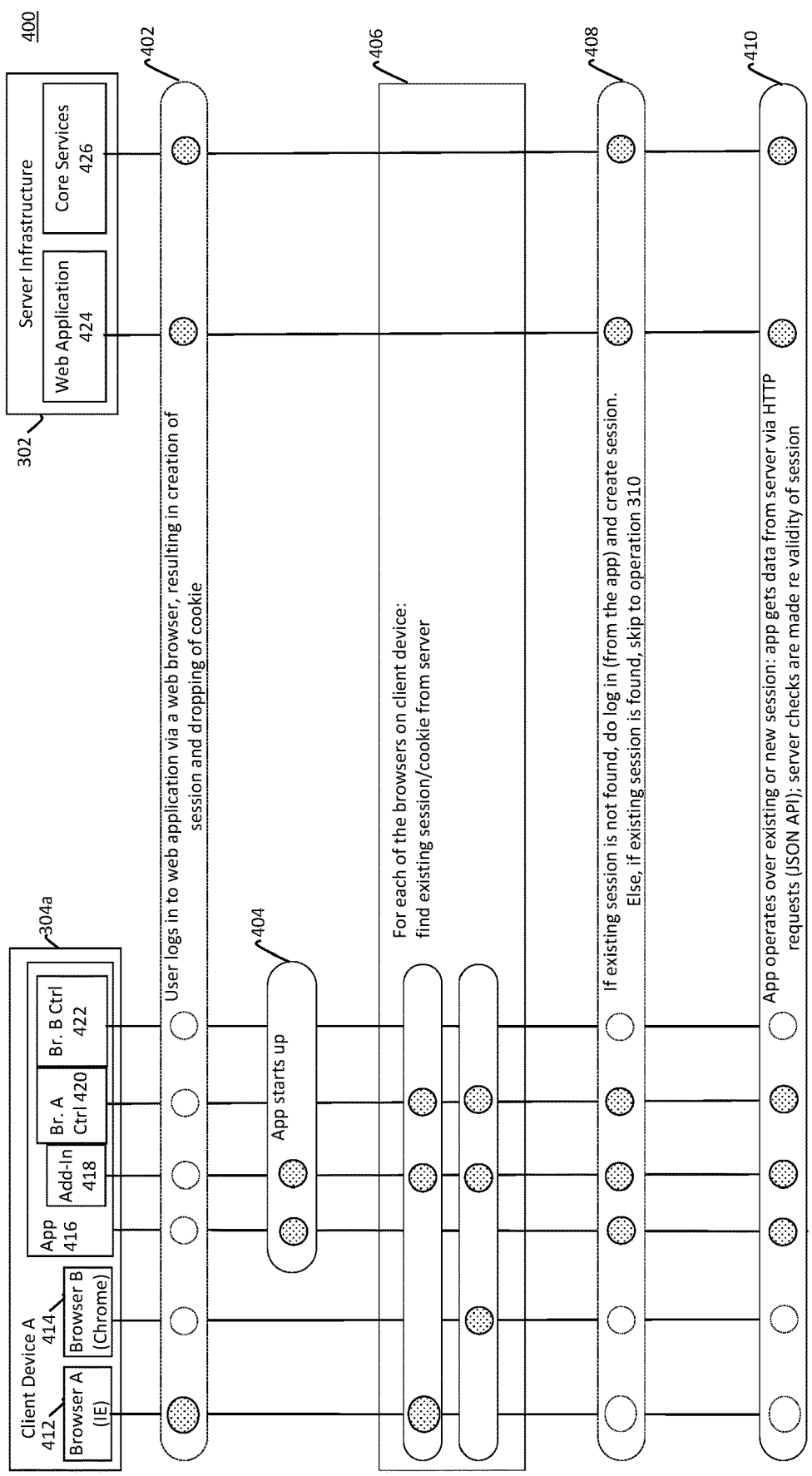
FIG. 4 illustrates a flow diagram showing interactions between a client device and a server device when a single sign-on operation is performed, according to some example embodiments.

Description of FIG. 4

FIG. 4 is a flowchart illustrating interactions between a client 304a and servers 302 that may occur in a single sign-on process 400 for a user on client 304a, according to some example embodiments.

Process 400 may be entered when a user using client 304a navigates a browser to a web application executing on servers 302. For example, the user may enter into the web browser, a predetermined URL (uniform resource locator) for accessing the web application. Alternatively, the browser may be directed to the web application when the user "clicks" on a link displayed on a web page. The web page of a web application encountered upon first arrival to the web application is referred to as the "landing page".

Having navigated to the landing page of the web application using the web browser (e.g., Internet Explorer browser 412), at operation 402, the user is signed-on (also referred to as "logged in") to the web application (e.g., 424). The sign-on process for the user, when successful, results in the creation of a session and the generation of a cookie. The creation of a session includes adding an entry to a session table. The cookie may be unique to the created session, and may be a text string generated using conventional techniques. The cookie may include client device information obtained by the application in browser 412 on the client 304a from client information process 324 using a process as described in relation to FIG. 2. The cookie is returned by server 302 to browser 412 on client 304a, and is saved at client 304a for future use. Subsequent requests (e.g., HTTP requests) by the user using client 304a to web application 424 includes the cookie, and server 302 may use the received cookie for keeping track of related requests. At this point the user is properly signed-on to the web application, and a client-side portion of the web application operating in the browser content can exchange messages and/or data with the server-side portion of the web application.

Operation 402 is illustrated in FIG. 4 with the flow lane of browser A 412 and the flow lanes of web application 424 and core services 426 marked with a solid-lined and/or filled in circle, whereas the flow lanes of browser B 414 and app 416 have respective dashed-lined circles. A solid-lined and/or filled in circle in a flow lane in an operation such as operation 402 is indicative that the system component corresponding to the flow lane actively participates (e.g., exchange messages with another system component) in this operation. Moreover, although it is generally the case that operations are ordered from the top to the bottom of the page according to the order 3 of occurrence in time, in some embodiments one or more of the operations may occur concurrently. Some embodiments may include additional one or more operations not shown in the figures, and/or may not include one or more operations shown.

At operation 404, a second client application (e.g., 416), for example, a native app 416 is started on the client 304a. The native app 416 is an application that accesses the web application 424 on server 302. According to some example embodiments, the native app is a spreadsheet application (e.g., Microsoft Excel™) that, during operation, acquires and/or exchanges data from/with the web application 424 on servers 302.

The native app 416 may be configured to use any of one or more browser controllers for communicating with server 302 via, for example, HTTP, for example, by exchanging HTTP messages with the web server associated with the web application 424. One or more browser controllers may be available to the native app. A browser controller provides a capability for an application, such as an Excel™ program, to utilize HTTP, JSON and/or other protocols used for control and data exchange over the web. For example, the native app may incorporate commercially or freely available browser controllers for one or more of Internet Explorer™, Chrome™, Firefox™, Safari™, etc. The native app may also include a customized add-in component (e.g., 418) that provides capabilities associated with the SSO function. Add-in 418, for example, enables an Excel™ spreadsheet in the native app 416 to interact, using one or more browser controls, with web application 424. In some example embodiments, the custom add-in 418 is created using Microsoft Automation™ or Microsoft COM™.

After the native app 416 is started, at operation 406, the native app identifies if there is at least one existing session for any browser (e.g., 412 and 414) installed on the client. The native app may be made aware of the browsers available on the client by any technique such as searching the client storage during at install and/or application startup in known locations of the directory structure for each particular browser, a predetermined configuration, etc. Alternatively or additionally, the native app may identify and automatically incorporate a browser controls (e.g., 420 and 422) for each browser that is installed on the client.

Each of the applications in the client 304a may, upon startup or before communication with server 302, communicate with a client information process (not separately shown in FIGS. 4-6) on the client 304a and obtain client device information that it provides to server 302. As described above in relation to FIGS. 1 and 2, the client information process (such as client information process 124 described above) provides client device specific information that can be used by the server to reliably determine whether the various client applications reside on the same client device.

When the server 302 receives a request from client 304a, it determines whether an active session that corresponds to the information provided (e.g., corresponding to any one or a combination of a cookie included in the HTTP request, the user, the client, web application, and the browser) with the received request exists. The determination may be made by searching the session table to identify a corresponding session. In an example embodiment, a cookie created at the time when the session is established is sent by the client in each subsequent HTTP request to the server, and the server uses the received cookie to uniquely identify the corresponding session in the session table. If it is determined that a corresponding session is currently active, the session information and/or a cookie associated with the corresponding session is returned to the native application.

If it is determined, at the server, that no corresponding session exists for a received HTTP request, then the server returns a notification to that effect to the native application. In some example embodiments, for example, an HTTP redirect (e.g., "402 redirect") message is returned. The native application, upon receiving a notification that the previous HTTP request did not result in identifying an existing connection, forms a new HTTP request including information regarding the next browser in the list of browsers to be tried.

If, no existing session is found corresponding to any of the browser controls available to the native app, then at operation 408, sign-on is successfully performed and a new session and associated cookie is created.

Subsequently, at operation 410, the native app operates using either the already existing session identified at operation 406 or the newly created session (created at operation 408). The operation of the native app may involve transmitting HTTP requests for data required for the native app and receiving such data in HTTP/JSON format. However, native apps are not limited to using HTTP/JSON for communicating with server-side applications such as web application. When the server device receives a request for data from the web application, the validity of the session may be checked.

Figure 5:
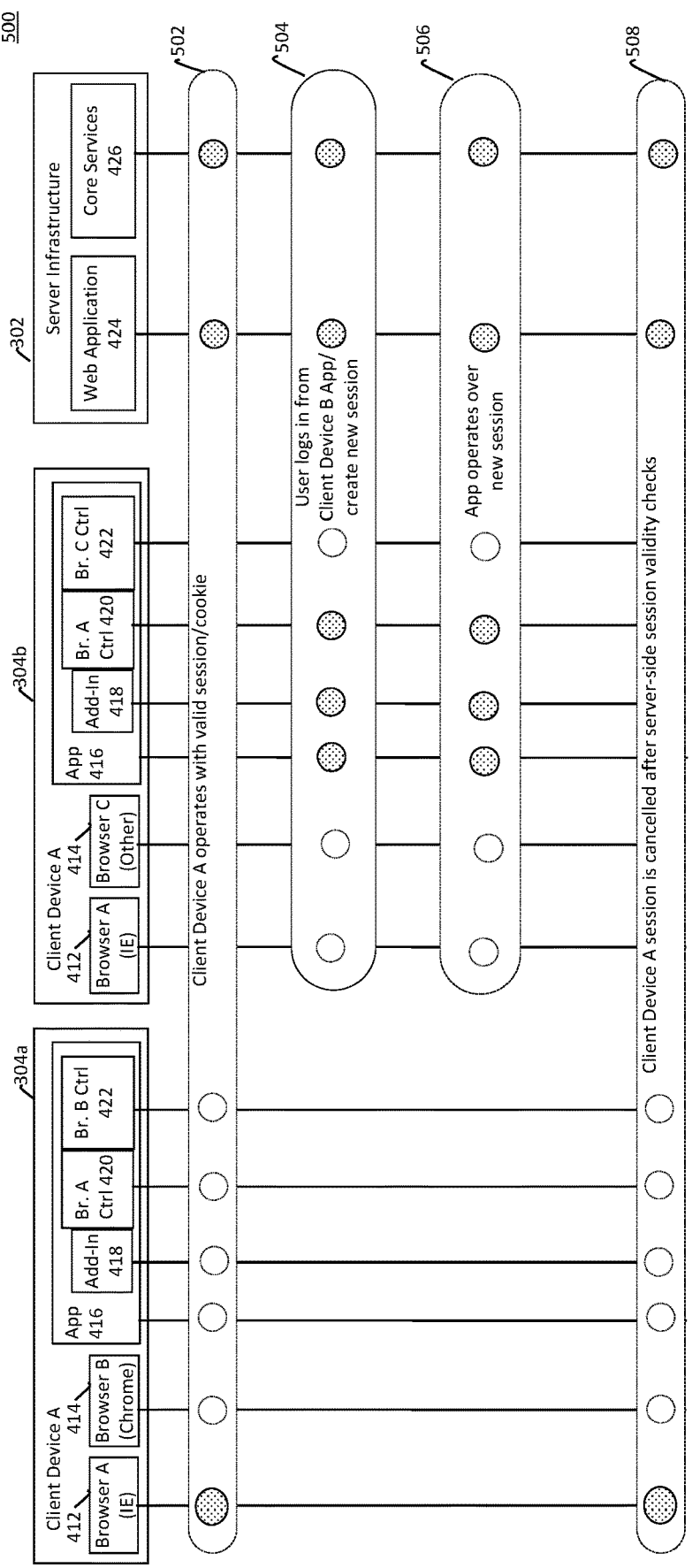
FIG. 5 illustrates a flow diagram showing interactions between client devices and a server device when a multiple login prevention operation is performed, according to some example embodiments.

Description of FIG. 5

FIG. 5 illustrates interactions between a client device 304a, client device 304b and a server device 302 that occur when a multiple login prevention (MLP) process 500 is performed. Process 500 may be commenced, for example, when a user already logged in from one client device (e.g., client device 304a) to access a web application (e.g., 424), signs in from a second client device (e.g., client device 304b) to access the same web application.

Operation 502 represents communication between the user on client device 304a and the web application on server device 302 over an established session using a valid cookie. As illustrated, one of the browsers and/or the native app on client device 304a may perform the communication over the established session.

At some point while operation 502 is ongoing, at operation 504, the user signs-on on client device 304b. For example, the user may log in via the native app on client device 304b.

At operation 506, the native app on client device 304b communicates with the web application on the server device by transmitting HTTP requests and receiving JSON formatted data. As noted above, server-side checks on the validity of the session are made before requested data is sent to the requesting native app.

Operation 508 represents the cancelling of the session between client device 304a and server device 302. The cancelling of the earlier existing session may be performed at substantially the same time as when the new session is created. After the session for client device 304a has been cancelled, subsequent HTTP requests from client device 304a for data from the web application fails. The client device 304a user interface may be updated to indicate the failure to any longer obtain data from the web application and/or to notify the user that the session to client device 304a has been cancelled due to login from another location.

Figure 6:
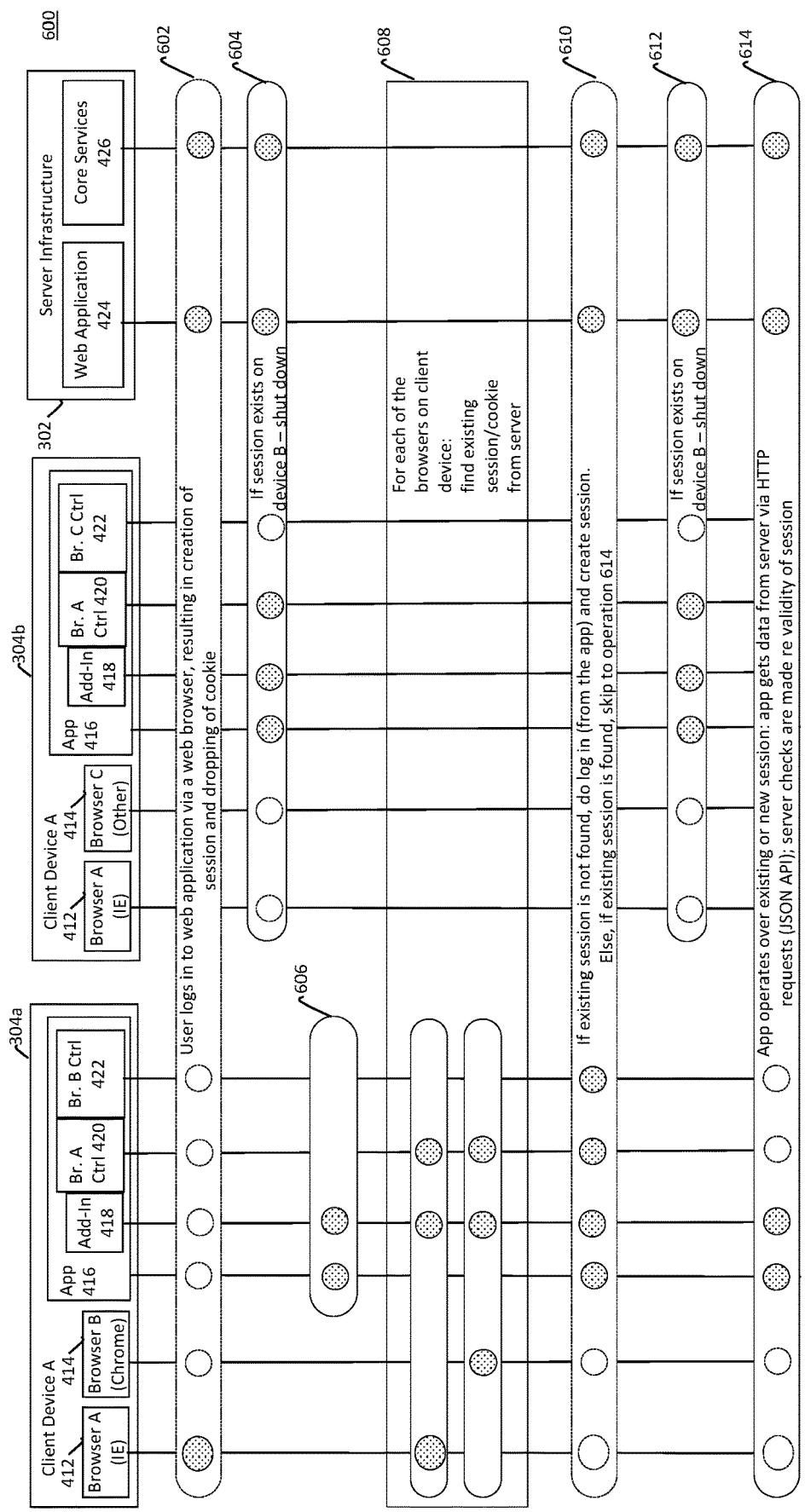
FIG. 6 illustrates a flow diagram showing interactions between client devices and a server device when a single sign-on operation is followed by a multiple login prevention, according to some example embodiments.

Description of FIG. 6

FIG. 6 illustrates interactions between client 304a, client 304b and a server infrastructure 302 showing SSO and MLP in a combined series of interactions, according to some example embodiments.

Process 600 may be commenced when the user navigates the page in the browser to a so-called landing page for the web application. The navigation may be performed by entering a URL for the landing page, or by clicking on a corresponding link from another web page.

At operation 602, a user on client 304a signs-in to web application 312 via browser 316. As described in relation to operation 402 of FIG. 4, a new session is created for the user to interact with web application 312, and one or more corresponding cookies may be generated.

At operation 604, any active sessions the user has from client 304b are deactivated or removed. For example, as part of the new session setup at operation 602, any sessions the same user has from other clients are deactivated. Deactivation may include marking a session table to indicate that one or more sessions are not active or altogether removing such sessions from the session table.

If client 304b had an active session ongoing at the time of operation 602, the entry in the session table for that session would be removed or marked as inactive. After such removal or marking as inactive, any subsequent requests for data by the client 304b to web application 312 will be unsuccessful because the session validity check on the server side in response to each data request will fail for not finding an active session associated with the user and the client 104b for the web application. This illustrates an implementation of MLP.

At operation 606, app 320 on client 304a starts up. The processing associated with this operation is similar to that described in association with operation 404 of FIG. 4.

At operation 608 the app determines existing sessions. The processing associated with this operation is similar to that described in association with operation 406 of FIG. 4.

If, no existing session is found corresponding to any of the browser controls available to the app, then at operation 610, sign-on is successfully performed and a new session and associated cookie is created. The processing in this operation may be similar to that described above in relation to operation 408. If an existing session for the user from client device 304a was found at operation 608, then processing proceeds to operation 614 below.

At operation 612, in response to a new session established for the user from client device 304a, any sessions of the user from client device 304b are deactivated in accordance with MLP.

Subsequently, at operation 614, the app operates using either the already existing session identified at operation 608 or the newly created session (created at operation 610). If an existing session for the user from client device 304a was found at operation 608, then, in accordance with SSO, the app may use the already existing session. The processing involved in this operation may be similar to that described with respect to operation 410 above.

Figure 7:
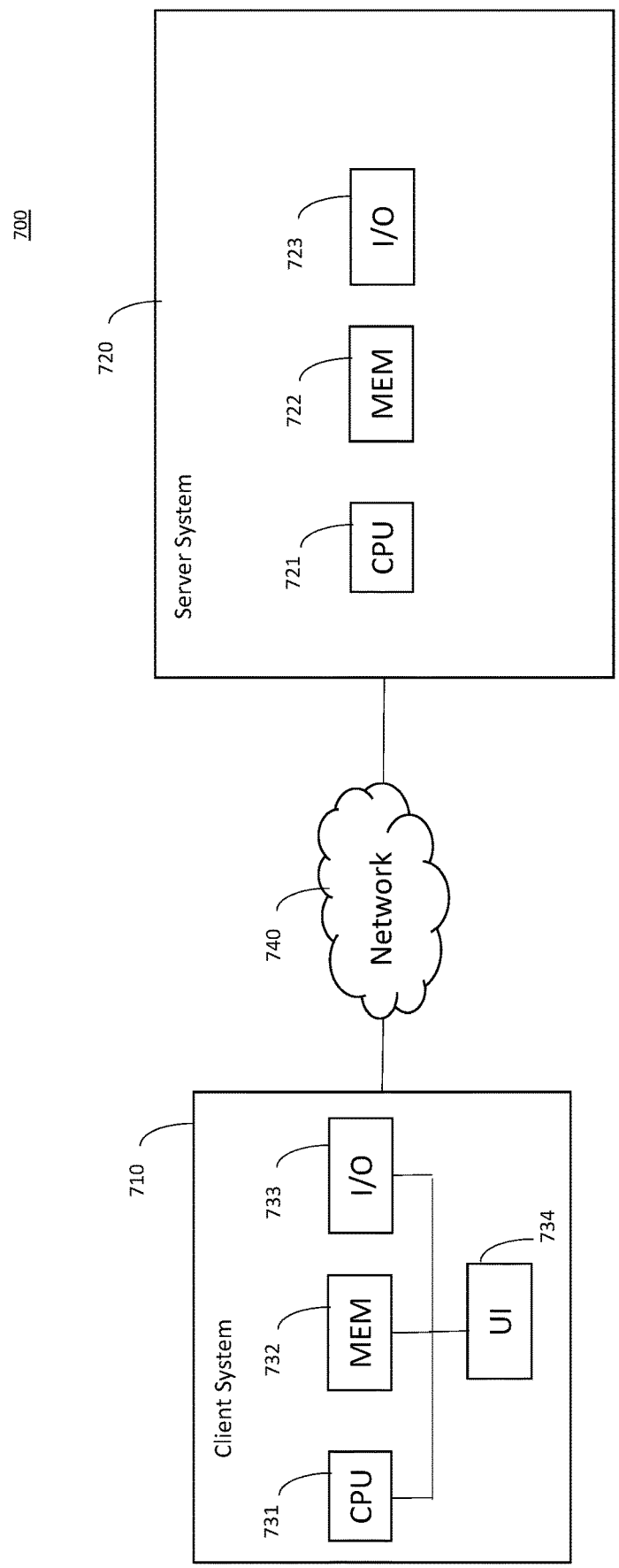
FIG. 7 schematically illustrates a computing environment in which the client devices and/or servers can be implemented, in accordance with some example embodiments.

Description of FIG. 7

FIG. 7 shows a non-limiting example block diagram of a hardware architecture for the systems 100 and 300. In the example shown in FIG. 7, the client system 710 communicates with a server system 720 via a network 740. The network 740 could comprise a network of interconnected computing devices, such as the internet. The network 740 could also comprise a local area network (LAN) or could comprise a peer-to-peer connection between the client system 710 and the server system 700.

The example client system 710 and server system 700 could correspond to clients 104 (also 304) and server 102 (also 302) as shown in FIGS. 1 and 3. That is, the hardware elements described in FIG. 7 could be used to implement the various software components and actions shown and described herein with reference to FIGS. 1 and 3. For example, the client system 710 in FIG. 7 could include at least one processor CPU 731, at least one memory 732, at least one input/output device I/O 733, and a component for generating and displaying a user interface UI 734. The at least one memory 732 may include a computer readable storage medium such as, for example, random access memory (RAM), static RAM, flash memory, magnetic disk. The I/O device 733 can be all encompassing and could include a communication device, such as a transceiver for sending and receiving data (e.g., a wireless transceiver, a wired transceiver). I/O device 733 could also include an interface for connecting a non-transitory computer readable storage medium to the client system 710 to send and receive data.

It should be appreciated that the combination of elements in client system 710 could be used to implement the example web browser applications 318, 317 and app 320a in FIG. 3, or applications 118, 120, 122 and 124. For example, the memory 732 could load the files associated with the application (e.g., HTML, XML, JavaScript files) and the CPU 731 could be used to execute instructions associated with the application. The I/O device 733 could be utilized to fetch the various elements comprising the SPA from the server system 720 and/or to interact with the user.

Server system 720 also comprises various hardware components used to implement the software elements for server 102 as shown in FIG. 1 or 302 in FIG. 3. For example, server systems 102 and 302 could also include hardware components of at least one processor CPU 721, at least one memory 722, and at least one input/output device I/O 723. The at least one memory 722 may include a computer readable storage medium such as, for example, random access memory (RAM), static RAM, flash memory, magnetic disk. The I/O device 723 can be all encompassing and could include a communication device, such as a transceiver for sending and receiving data (e.g., a wireless transceiver, a wired transceiver). I/O device 723 could also include an interface for connecting a non-transitory computer readable storage medium to the server system 700 to send and receive data. In one example embodiment, I/O device 733 of the client system can perform communication via the network with I/O 723 of the server system.

Similar to client system 710, the server system 720 could implement and/or execute the applications. For example, the memory 722 could be used to store the information in database 310 as well as the components and files utilized by web servers and application servers associated with, for example, the web applications 312 and core services 314. The CPU 721 could be used in executing the software necessary to generate the respective modules that are requested by and transmitted to the client system 710. For example, CPU 721 could be used to generate the necessary modules created by an application server. Likewise, I/O device 723 can be used by a web server to transmit the different application elements to the client system 710. Of course, these examples are non-limiting and the system envisions utilizing the hardware elements in a variety of aspects.

Figure 8:
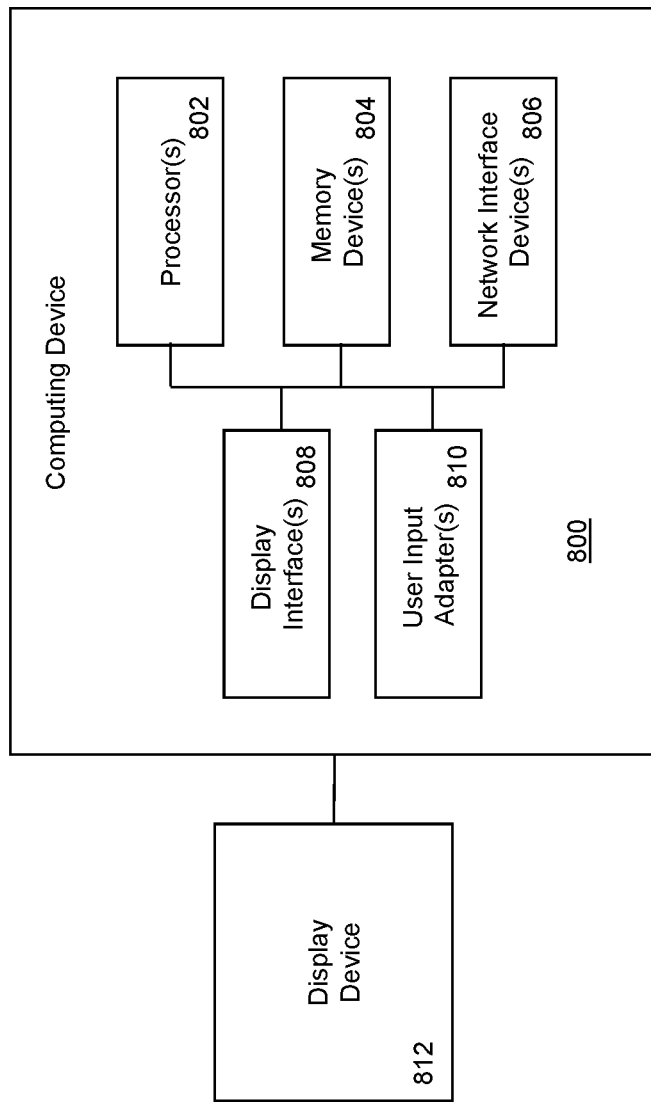
FIG. 8 shows an example computing device that may be used in some embodiments to implement features described herein.

Description of FIG. 8

FIG. 8 is a block diagram of an example computing device 800 (which may also be referred to, for example, as a "computing device," "computer system," or "computing system") according to some embodiments. In some embodiments, the computing device 800 includes one or more of the following: one or more processors 802; one or more memory devices 804; one or more network interface devices 806; one or more display interfaces 808; and one or more user input adapters 810. Additionally, in some embodiments, the computing device 800 is connected to or includes a display device 812. As will explained below, these elements (e.g., the processors 802, memory devices 804, network interface devices 806, display interfaces 808, user input adapters 810, display device 812) are hardware devices (for example, electronic circuits or combinations of circuits) that are configured to perform various different functions for the computing device 800.

In some embodiments, each or any of the processors 802 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 802 uses an instruction set architecture such as x86 or Advanced RISC Machine (ARM).

In some embodiments, each or any of the memory devices 804 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 802). Memory devices 804 are examples of non-volatile computer-readable storage media.

In some embodiments, each or any of the network interface devices 806 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 808 is or includes one or more circuits that receive data from the processors 802, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 812, which displays the image data. Alternatively or additionally, in some embodiments, each or any of the display interfaces 808 is or includes, for example, a video card, video adapter, or graphics processing unit (GPU).

In some embodiments, each or any of the user input adapters 810 is or includes one or more circuits that receive and process user input data from one or more user input devices (not shown in FIG. 8) that are included in, attached to, or otherwise in communication with the computing device 800, and that output data based on the received input data to the processors 802. Alternatively or additionally, in some embodiments each or any of the user input adapters 810 is or includes, for example, a PS/2 interface, a USB interface, a touchscreen controller, or the like; and/or the user input adapters 810 facilitates input from user input devices (not shown in FIG. 8) such as, for example, a keyboard, mouse, trackpad, touchscreen, etc.

In some embodiments, the display device 812 may be a Liquid Crystal Display (LCD) display, Light Emitting Diode (LED) display, or other type of display device. In embodiments where the display device 812 is a component of the computing device 800 (e.g., the computing device and the display device are included in a unified housing), the display device 812 may be a touchscreen display or non-touchscreen display. In embodiments where the display device 812 is connected to the computing device 800 (e.g., is external to the computing device 800 and communicates with the computing device 800 via a wire and/or via wireless communication technology), the display device 812 is, for example, an external monitor, projector, television, display screen, etc.

In various embodiments, the computing device 800 includes one, or two, or three, four, or more of each or any of the above-mentioned elements (e.g., the processors 802, memory devices 804, network interface devices 806, display interfaces 808, and user input adapters 810). Alternatively or additionally, in some embodiments, the computing device 800 includes one or more of: a processing system that includes the processors 802; a memory or storage system that includes the memory devices 804; and a network interface system that includes the network interface devices 806.

The computing device 800 may be arranged, in various embodiments, in many different ways. As just one example, the computing device 800 may be arranged such that the processors 802 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 800 may be arranged such that: the processors 802 include two, three, four, five, or more multi-core processors; the network interface devices 806 include a first network interface device that implements Ethernet and a second network interface device that implements WiFi and/or Bluetooth; and the memory devices 804 include a RAM and a flash memory or hard disk.

Whenever it is described in this document that a software module or software process performs any action, the action is in actuality performed by underlying hardware elements according to the instructions that comprise the software module. Consistent with the foregoing, in various embodiments, each or any combination of the server 102, client device 104, first client application 118, second client application 122, client information daemon 124, server side process of web application 126, browser 120, operating system 116, processors 112, communications interfaces 114, client devices 304, server 302, web application 312, core services 314, DBMS 310, browsers 316 and 317, app client-side code 318, app 320*a* and 320*b*, client information daemon 324, etc., each of which will be referred to individually for clarity as a "component" for the remainder of this paragraph, are implemented using an example of the computing device 800 of FIG. 8. In such embodiments, the following applies for each component: (a) the elements of the computing device 800 shown in FIG. 8 (i.e., the one or more processors 802, one or more memory devices 804, one or more network interface devices 806, one or more display interfaces 808, and one or more user input adapters 810), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 804 (e.g., in various embodiments, in a volatile memory device such as a RAM or an instruction register and/or in a non-volatile memory device such as a flash memory or hard disk) and all actions described herein as performed by the software modules are performed by the processors 802 in conjunction with, as appropriate, the other elements in and/or connected to the computing device 800 (i.e., the network interface devices 806, display interfaces 808, user input adapters 810, and/or display device 812); (c) alternatively or additionally, to the extent it is described herein that the component processes and/or otherwise handles data, in some embodiments, such data is stored in the memory devices 804 (e.g., in some embodiments, in a volatile memory device such as a RAM and/or in a non-volatile memory device such as a flash memory or hard disk) and/or is processed/handled by the processors 802 in conjunction, as appropriate, the other elements in and/or connected to the computing device 800 (i.e., the network interface devices 806, display interfaces 808, user input adapters 810, and/or display device 812); (d) alternatively or additionally, in some embodiments, the memory devices 802 store instructions that, when executed by the processors 802, cause the processors 802 to perform, in conjunction with, as appropriate, the other elements in and/or connected to the computing device 800 (i.e., the memory devices 804, network interface devices 806, display interfaces 808, user input adapters 810, and/or display device 812), each or any combination of actions described herein as performed by the component and/or by any software modules described herein as included within the component. The hardware configurations shown in FIG. 8 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 8, (e) via other hardware arrangements, architectures, and configurations, and/or via combinations of the technology described in (a) through (e).

Technical Advantages of Described Subject Matter

The technology described above provides for plural application processes including at least one application in a browser to reliably acquire device information that can subsequently be used by other processes to accurately determine whether the plural applications are running on the same client device and/or are associated with aspects of the same client device. The described technology may improve the reliability of the acquired device information by, for example, relying upon processes with high level access privileges to obtain device information that is not directly accessible to most application processes. The more accurate determination of the devices associated with respective application processes in web environments can be used to improve SSO and MLP implementations. Improved, and more accurate, SSO and MLP determinations by the servers based upon the technologies described here, may lead to improved resource utilization by reducing the number of unauthorized users using applications.

The technical features described herein may thus improve verifiability of user access to server resources and the reliability with which determinations are made regarding the source of requests. Consequently, the technical features also improve security of servers and applications running on servers and may also improve the speed of servicing and utilization of memory etc., by providing for reliably preventing unauthorized access to server resources.

Selected Terminology

In the examples described herein, for purposes of explanation and non-limitation, specific details are set forth, such as particular nodes, functional entities, techniques, protocols, standards, etc., in order to provide an understanding of the described technology. It will be apparent to one skilled in the art that other embodiments may be practiced apart from the specific details described below. In other instances, detailed descriptions of well-known methods, devices, techniques, etc., are omitted so as not to obscure the description with unnecessary detail. Individual function blocks are shown in the figures. Those skilled in the art will appreciate that the functions of those blocks may be implemented using individual hardware circuits (e.g., as shown in FIG. 7), using software programs (e.g., as shown in FIG. 1) and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models, and/or distributed databases) may be used to store and manipulate data.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could"

is used, it should be understood that the given action, feature, element, component, attribute, etc., is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 2 and 4-6, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Various forms of computer readable media/transmissions may be involved in carrying data (e.g., sequences of instructions) to a processor. For example, data may be (i) delivered from a memory to a processor; (ii) carried over any type of transmission medium (e.g., wire, wireless, optical, etc.); (iii) formatted and/or transmitted according to numerous formats, standards or protocols, such as Ethernet (or IEEE 802.3), ATP, Bluetooth, and TCP/IP, TDMA, CDMA, 3G, etc.; and/or (iv) encrypted to ensure privacy or prevent fraud in any of a variety of ways well known in the art.

While the technology has been described in relation to AngularJS, this is done for ease of description; it is to be understood that the technology described in this document is applicable in the context of other SPA technologies, other web technologies, and/or any other software technology.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system comprising:
a client device comprising a first processing system having at least one processor, wherein the first processing system is configured to perform operations comprising:
executing, on the client device, (1) a first client application within a web browser, the first client application providing a first client-side portion of a web application; (2) a second client application providing a second client-side portion of the web application; and (3) a service application at a privilege level different from a privilege level of the first client application or the second client application, the service application being configured to determine at least one piece of client identifying information that uniquely identifies the first processing system and to provide the determined at least one piece of client identifying information to the first client application and to the second client application,
wherein the first client application and the second client application obtain the determined at least one piece of client identifying information from the service application,
wherein the first client application transmits a first request with the obtained at least one piece of client identifying information,
wherein the second client application transmits a second request with the obtained at least one piece of client identifying information, and
wherein the service application comprises HTTP server functionality, and communication between the service application and the first client application is based upon HTTP and JSON; and
at least one server device comprising a second processing system having at least one processor, wherein the second processing system is configured to execute a server-side process of the web application and to perform operations comprising:
receiving the first request from the first client application and the second request from the second client application, the first request including a first client identifying information and the second request including second client identifying information;
determining whether the second client identifying information corresponds to the first client identifying information; and
performing a first action which includes enabling the first and second client applications to share a login session if the determining determines that the second client identifying information corresponds to the first client identifying information, and performing a second action which includes disabling a login session for at least one of the first and second client applications if the determining determines that the second client identifying information does not correspond to the first client identifying information.

2. The system according to claim 1, wherein the second processing system is further configured to provide for disabling a session represented by a session identifier provided by the first client application or the second client application if the determining determines that the second client identifying information does not correspond to the first client identifying information.

3. The system according to claim 1, wherein the service application obtains the information unique to the first processing system from an operating system of the first processing system, and wherein at least one of the first client application or the second client application has insufficient access privileges to obtain the information unique to the first processing system directly from the operating system.

4. The system according to claim 1, wherein the determined at least one piece of identifying information is at least partly based upon a unique identifier of a hardware element or a software element in the first processing system.

5. The system according to claim 1, wherein the determined at least one piece of client identifying information is at least partly based upon a unique identifier associated with a software element in the first processing system.

6. The system according to claim 1, wherein, upon startup, the service application automatically binds to a first available port by sequentially searching from a predetermined port.

7. The system according to claim 1, wherein the communication includes a HTTP query which includes a request portion having included therein a timestamp.

8. The system according to claim 7, wherein the first client application is further configured to, upon receiving a response to the HTTP query, compare a timestamp returned with the response against a current time and accept the response only if the time difference between the returned timestamp and the current time is less than a predetermined interval.

9. The system according to claim 7, wherein a request parameter of the HTTP query is encrypted, and a command identifier in the HTTP query is not encrypted.

10. A method performed in a client device by a first processing system having at least one processor, the method comprising:
running on the client device (A) a first client application within a web browser, the first client application providing a first client-side portion of a web application, (B) a second client application providing a second client-side portion of the web application, and (C) a service application at a privilege level different from a privilege level of the first client application or the second client application, the service application being configured to determine at least one piece of client identifying information that uniquely identifies the first processing system and to provide the determined at least one piece of client identifying information to the first client application and to the second client application, wherein the first client application, the second client application and the service application run on the client device, and wherein the service application comprises HTTP server functionality, and communication between the service application and the first client application is based upon HTTP and JSON;
obtaining, by the first client application and the second client application, the determined at least one piece of client identifying information from the service application;
transmitting to the server-side process of the web application, by the first client application and the second client application, respective requests including the obtained at least one piece of client identifying information; and
responsive to a response received from the server-side process for the second request, determining further processing of at least one of the first client application or the second client application.

11. The method according to claim 10, wherein the determined at least one piece of client identifying information comprises information unique to the first processing system.

12. The method according to claim 11, wherein the service application obtains the information unique to the first processing system from an operating system of the first processing system, and wherein at least one of the first client application or the second client application has insufficient access privileges to obtain the information unique to the first processing system directly from the operating system.

13. The method according to claim 10, further comprising: providing, by the second processing system, for disabling, by the second a session represented by a session identifier provided by the first client application or the second client application if the determining determines that the second client identifying information does not correspond to the first client identifying information.

14. The method according to claim 10, further comprising: obtaining, by the service application, the information unique to the first processing system from an operating system of the first processing system, and wherein at least one of the first client application or the second client application has insufficient access privileges to obtain the information unique to the first processing system directly from the operating system.

15. The method according to claim 13, wherein, upon startup, the service application automatically binds to a first available port by sequentially searching from a predetermined port, and wherein the communication includes a HTTP query which includes a request portion having included therein a timestamp.

16. The method according to claim 14, wherein the first client application is further configured to, upon receiving a response to the HTTP query, compare a timestamp returned with the response against a current lime and accept the response only if the time difference between the returned timestamp and the current time is less than a predetermined interval.

17. A non-transitory computer-readable storage device having stored therein instructions, that when executed by at least one processor of a first processing system of a client device, causes the first processing system to perform operations comprising:
running on the client device (A) a first client application within a web browser, the first client application providing a first client-side portion of a web application, (B) a second client application providing a second client-side portion of the web application, and (C) a service application at a privilege level different from a privilege level of the first client application or the second client application, the service application being configured to determine at least one piece of client identifying information that uniquely identifies the first processing system and to provide the determined at least one piece of client identifying information to the first client application and to the second client application, wherein the first client application, the second client application and the service application run on the client device, and wherein the service application comprises HTTP server functionality, and communication between the service application and the first client application is based upon HTTP and JSON;

obtaining, by the first client application and the second client application, the determined at least one piece of client identifying information from the service application;

transmitting to the server-side process of the web application, by the first client application and the second client application, respective requests including the obtained at least one piece of client identifying information; and responsive to a response received from the server-side process for the second request, determining further processing of at least one of the first client application or the second client application.

18. The non-transitory computer readable media device according to claim 17, wherein the stored instructions, when executed by at least one processor of a first processing system of the client device, causes the first processing system to perform further operations comprising:

providing, by the second processing system, for disabling, by the second a session represented by a session identifier provided by the first client application or the second client application if the determining determines that the second client identifying information does not correspond to the first client identifying information.

* * * * *